(12) United States Patent
Grech et al.

(10) Patent No.: US 9,398,628 B2
(45) Date of Patent: Jul. 19, 2016

(54) SELECTION OF A BASESTATION PHYSICAL LAYER IDENTIFIER

(71) Applicant: UBIQUISYS LIMITED, Swindon, Wiltshire (GB)

(72) Inventors: Sandro Grech, Bath (GB); Andrea Giustina, Milan (IT); James Briers, Wiltshire (GB); Gbenga Salami, Wilsthire (GB)

(73) Assignee: UBIQUISYS LIMITED, Swindon, Wiltshire (GB)

( * ) Notice: Subject to any disclaimer, the term of this patent is extended or adjusted under 35 U.S.C. 154(b) by 42 days.

(21) Appl. No.: 14/194,164

(22) Filed: Feb. 28, 2014

(65) Prior Publication Data

US 2014/0295813 A1    Oct. 2, 2014

(30) Foreign Application Priority Data

Mar. 28, 2013   (GB) .................................. 1305698.1

(51) Int. Cl.
*H04W 40/00* (2009.01)
*H04W 76/02* (2009.01)
(Continued)

(52) U.S. Cl.
CPC ............ *H04W 76/021* (2013.01); *H04W 16/18* (2013.01); *H04W 24/02* (2013.01); *H04W 16/00* (2013.01); *H04W 84/00* (2013.01)

(58) Field of Classification Search
CPC ... H04W 24/02; H04W 84/045; H04W 48/16; H04W 16/18; H04W 16/10; H04W 36/0061; H04W 72/082; H04W 36/0088; H04W 72/005; H04W 36/20; H04W 52/244; H04W 84/0005; H04W 16/00; H04W 74/085

USPC .................. 370/252, 320; 455/436, 434, 561, 455/418–422.1, 432.1–456.1
See application file for complete search history.

(56) References Cited

U.S. PATENT DOCUMENTS

2010/0020710 A1*  1/2010  Gupta et al. .................. 370/252
2010/0291929 A1*  11/2010  Stephens ............... H04W 24/02
                                                          455/436
(Continued)

FOREIGN PATENT DOCUMENTS

EP          1657950          5/2006
EP          1777974          4/2007
(Continued)

OTHER PUBLICATIONS

PCI Reselection and Use of Temporary PCIs R3-082455 3GPP TSG-RAN WG3 #61bis R3-082455 Sep. 30-Oct. 3, 2008 Prague, Czech Republic Qualcomm Europe.*

(Continued)

*Primary Examiner* — San Htun
(74) *Attorney, Agent, or Firm* — Patent Capital Group

(57) ABSTRACT

In one example embodiment, a method for selecting a physical layer identifier for use in a basestation is disclosed. The basestation may be comprised within a mobile communications network, which may also comprise a plurality of other basestations. The method comprises receiving a pool of identifiers available for use by basestations within the network and assigning a temporary identifier for the basestation. The method further comprises receiving from connected UEs reports of identifiers from among the received pool that are in use by basestations detected by the connected UEs and assigning a final identifier selected from the received pool of identifiers, the final identifier being different from the temporary identifier.

20 Claims, 7 Drawing Sheets

(51) Int. Cl.
*H04W 24/02* (2009.01)
*H04W 16/18* (2009.01)
*H04W 16/00* (2009.01)
*H04W 84/00* (2009.01)

(56) References Cited

U.S. PATENT DOCUMENTS

| | | | | |
|---|---|---|---|---|
| 2010/0291934 | A1* | 11/2010 | Lopes | H04W 24/02 455/446 |
| 2010/0317351 | A1* | 12/2010 | Gerstenberger et al. | 455/443 |
| 2011/0059744 | A1* | 3/2011 | Won | H04W 8/26 455/450 |
| 2011/0086652 | A1* | 4/2011 | So | H04W 24/02 455/501 |
| 2011/0274097 | A1* | 11/2011 | Zhang | H04W 48/08 370/338 |
| 2013/0040640 | A1* | 2/2013 | Chen | H04W 36/30 455/434 |
| 2013/0079003 | A1* | 3/2013 | Nagaraja | H04W 24/02 455/435.1 |
| 2013/0172031 | A1* | 7/2013 | Calippe | H04W 8/26 455/509 |
| 2014/0073304 | A1* | 3/2014 | Brisebois et al. | 455/418 |

FOREIGN PATENT DOCUMENTS

| | | |
|---|---|---|
| EP | 2320693 | 5/2011 |
| EP | 2785100 | 10/2014 |
| GB | 2512371 | 10/2014 |
| WO | 2009/067452 | 5/2009 |
| WO | 2083595 | 7/2009 |
| WO | 2010/011970 | 1/2010 |
| WO | 2010/132195 | 11/2010 |
| WO | 2012/148764 | 11/2012 |

OTHER PUBLICATIONS

EPO Sep. 1, 2014 Extended EPO Search Report and Opinion from European Application Serial No. 14162011.2.
UKIPO Sep. 20, 2013, Patents Act 1977: Search Report under Section 17, GB Application No. GB1305698.1, 2 pages.

* cited by examiner

SELECTION OF A BASESTATION PHYSICAL LAYER IDENTIFIER

CLAIM OF PRIORITY

This Application claims priority from the Patent Application filed in the United Kingdom on Mar. 28, 2013, having Application Serial No. GB 1305698.1 entitled "SELECTION OF A BASESTATION PHYSICAL LAYER IDENTIFIER," which is hereby incorporated by reference in its entirety.

TECHNICAL FIELD

The present disclosure relates to a basestation for use in a cellular mobile communications network and to a method, system, and apparatus for selecting a physical layer identifier for use in such a basestation.

BACKGROUND

In cellular mobile communication systems, each basestation is assigned a physical layer identifier, allowing user equipment devices (UEs) to distinguish between signals transmitted from different basestations. Physical layer identifiers may be realized in different ways according to different mobile communication standards. Two examples of physical layer identifiers are scrambling codes in WCDMA (Wideband Code Division Multiple Access) and Physical Layer Cell Identifiers (PCIs) in LTE (Long Term Evolution).

Physical layer identifiers are assigned to basestations in such a manner as to ensure that two operating conditions may be fulfilled. According to a first condition, known as collision avoidance, it should be ensured that a single UE does not simultaneously receive the same physical layer identifier (e.g. scrambling code or PCI) from more than one basestation or cell. Failure to meet this condition can have an adverse impact on call drop rate owing to UE failure to report neighboring basestations on an overlapping identifier. Call termination and call establishment success rate can also be affected as a result of UEs failing to detect a change in cell, and so failing to decode the relevant system information associated with the new cell.

According to another condition for physical layer identifiers, known as confusion avoidance, neighbor ambiguity should be avoided when a UE reports measurements for a particular physical layer identifier. Even if collision avoidance is satisfied, physical layer identifiers may be reused in geographically separate or distant locations. It is important for the network to be able to identify the correct cell in the context of its local neighbors for correct handover targeting. Failure to meet this condition can have an adverse impact on handover success rates and ultimately on call drop rates.

The established approach to ensuring compliance with the above discussed conditions is to use network cell planning techniques, followed by auditing and optimization of the system. During a network planning process, network planning tools automatically assign physical layer identifiers based on predicted cell adjacencies determined using radio propagation models. These identifier assignments are later transferred to the live network through a network management system. This established approach is effective for coordinated, pre-planned network deployment. However, the rapid growth in scale and complexity of mobile communications networks mean that this fully planed approach is becoming a large and difficult overhead for network operators to maintain. The drive to increase system capacity (the number of users supported by the system) and improve end user experience (for example through increased rates of data transfer) is leading to significant increases in the density of basestations being deployed. With so many basestations in the network, a traditional planning phase is no longer feasible before each deployment, and "ad-hoc" basestation deployment is becoming increasingly necessary. In ad-hoc deployments where traditional planning is not available, the basestation itself automatically performs the auditing and optimization steps of a physical layer identifier selection.

BRIEF DESCRIPTION OF THE DRAWINGS

For a better understanding of the present disclosure, and to show more clearly how it may be put into effect, reference will now be made, by way of example, to the accompanying drawings, in which.

DETAILED DESCRIPTION OF EXAMPLE EMBODIMENTS

For purposes of illustrating the techniques of the present disclosure, it is important to understand the communications that may be traversing a given communication system. The following foundational information may be viewed as a basis from which the present disclosure may be properly explained. Such information is offered earnestly for purposes of explanation only and, accordingly, should not be construed in any way to limit the broad scope of the present disclosure and its potential applications.

The challenge of ad-hoc basestation deployment is most frequently encountered in the deployment of small cell basestations, which may be used to complement existing macro layer network coverage, providing network access in areas where such coverage is problematic. Small cell basestations by their nature require an ad-hoc deployment. However, the above discussed evolution in mobile communications networks has resulted in a wider adoption of ad-hoc deployment practices and the development of auto-configuring basestations for use on both small cell and macro network layers.

One approach to the autonomous selection of a physical cell identifier is to cause the basestation in question to investigate the radio frequency environment of its deployment location, searching for neighboring cells and their assigned physical layer identifiers. In a small cell deployment, this investigation may take the form of a radio environment scan. The identifiers of detected neighboring cells can then be excluded from use when the basestation selects its own identifier from an available pool of identifiers.

A potential shortcoming with the above approach arises from the possibility for considerable differences to exist between the radio frequency (RF) environment experienced by the basestation, and that experienced by UEs connected to the basestation. Owing to the separation between a basestation and connected UEs, a basestation may not be able to detect all neighboring cells that a UE connected to the basestation can detect. This discrepancy between the RF environments of a basestation and its connected UEs is more pronounced for basestations exhibiting a greater coverage area, owing for example to a high transmit power. This situation is illustrated in FIG. 1 with reference to a network operating on the LTE standard.

Figure 1:
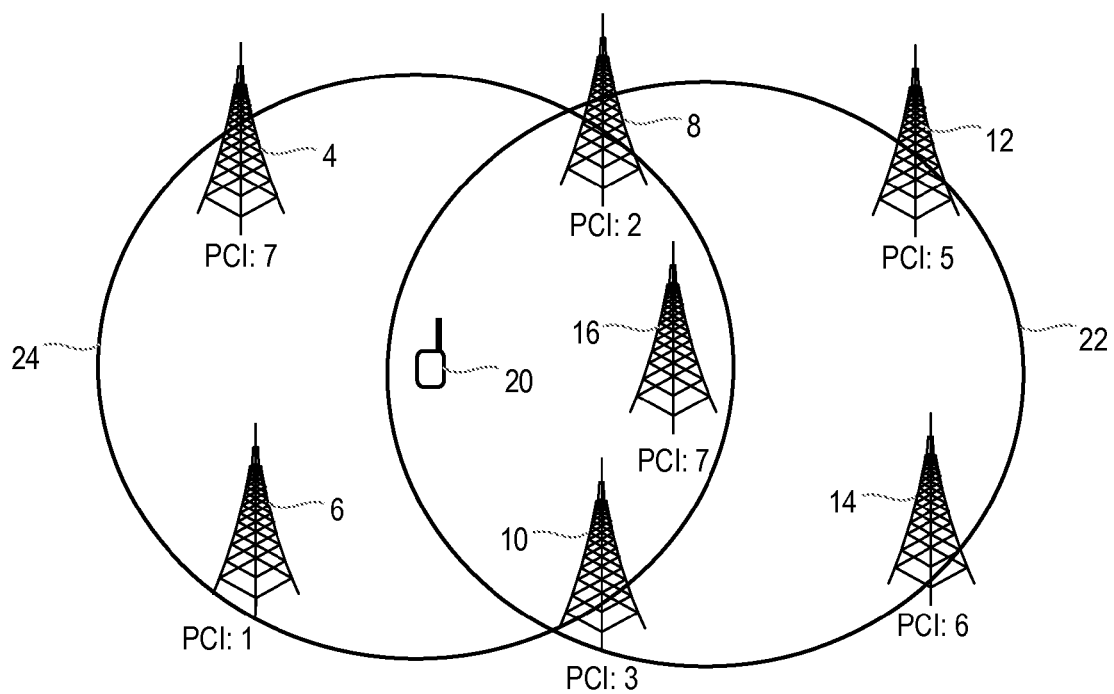
FIG. 1 illustrates a part of a cellular communications network.

FIG. 1 illustrates a part of a mobile communications network 2, showing several basestations 4, 6, 8, 10, 12, 14, 16 within the network and a single UE 20, which is connected to basestation 16. The detection area of basestation 16, to which the UE 20 is connected, is illustrated at 22 and the detection area of the UE 20 is illustrated at 24. The basestation 16 has selected a PCI 7 that is unique amongst the neighboring basestations that it can detect. However, this PCI is also being used by basestation 4, which, while outside the detection range of the basestation 16, is within the detection range of the UE 20 connected to basestation 16. A collision situation is thus created in which the UE 20 may simultaneously receive the same PCI from more than one basestation, despite its connected basestation having selected an apparently unique PCI.

In the context of the LTE standard, it has been proposed to rely on the capabilities of connected UEs to enable selection of a physical layer identifier for a basestation. However, once a basestation is providing service using an identifier, it is no longer able to detect collisions involving that identifier using UE measurements. UEs are only required to report measurements based on physical layer identities, and connected UEs will not therefore be able to distinguish between transmissions from the serving basestation and transmissions from another basestation using the same identifier as the serving basestation. All transmissions having the identifier of the serving basestation will be associated with the serving basestation.

According to the present disclosure, there is provided a method for selecting a physical layer identifier for use in a basestation in a mobile communications network, wherein the network comprises a plurality of other basestations, the method comprising:

receiving a pool of identifiers available for use by basestations within the network;
assigning a temporary identifier for the basestation;
receiving from connected UEs reports of identifiers from among the received pool that are in use by basestations detected by the connected UEs; and
assigning a final identifier selected from the received pool of identifiers;
wherein the final identifier is different from the temporary identifier.

According to another aspect of the present disclosure, there is provided: A method for assigning a temporary identifier to a basestation in a mobile communications network, wherein the network comprises a plurality of other basestations, the method comprising:

retrieving a set of identifiers available for use by basestations within the network, wherein the set is partitioned into a subset of identifiers reserved for temporary use and a subset of identifiers reserved for final use;
receiving from the basestation a report of identifiers in use by basestations within a threshold proximity of the basestation;
selecting from among the subset of identifiers reserved for temporary use an identifier which is not in use by a basestation within the threshold proximity of the basestation; and
allocating the selected identifier to the basestation as a temporary identifier.

According to another aspect of the present disclosure, there is provided a basestation adapted to operate in accordance with the method of the first or second aspects of the disclosure.

The following description illustrates aspects of the present disclosure with reference to an auto-configuring basestation. In certain embodiments the example of a small cell basestation is used, however it will be appreciated that this is for illustrative purposes only. The methods and apparatus provided by the present disclosure may be applied in any auto-configuring basestation unit, including but not limited to macro layer basestations, femtocells, micro basestations, pico basestations etc.

Figure 2:
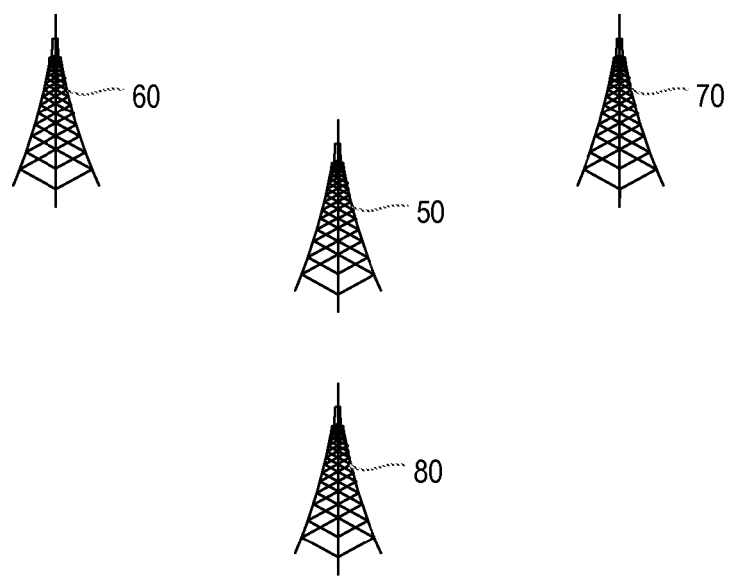
FIG. 2 illustrates a part of another cellular communications network.

FIG. 2 shows a part of a cellular communications network. In the illustrated cellular network, a basestation 50 has been deployed in the vicinity of three other basestations 60, 70, 80 within the same cellular network. It will be appreciated that a practical network will include many more basestations, but the present disclosure can be described sufficiently without illustrating additional basestations. The basestations 50, 60, 70, 80 communicate with user equipment devices (UEs) via wireless links. Signals are transmitted via the wireless link from the basestation to the UEs (downlink) or from the UEs to basestation (uplink).

Figure 3:
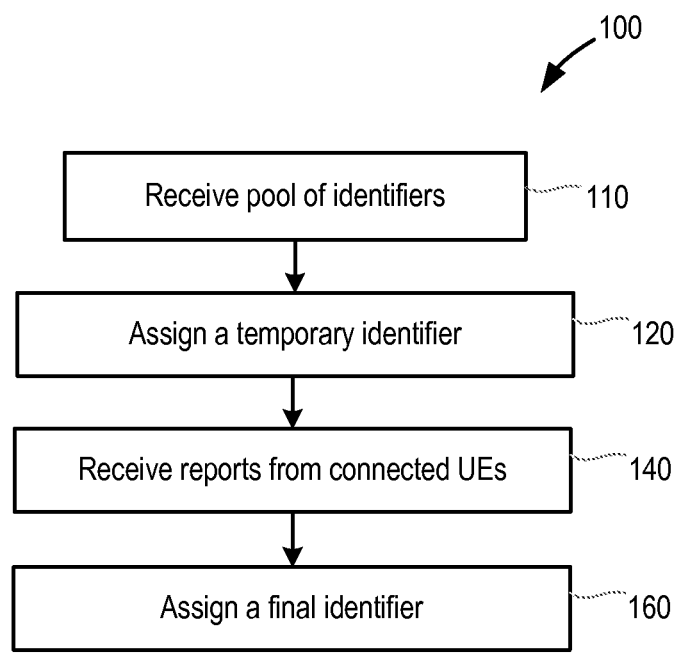
FIG. 3 is a flow chart illustrating steps in a method in accordance with the present disclosure.

FIG. 3 is a flow chart illustrating a process 100 performed by the basestation 50 during its installation. The process 100 enables the basestation to select a physical layer identifier in order to enter service within the network. The process may be conducted for example under the control of a processor comprised within the basestation 50. As discussed above, a physical layer identifier may for example take the form of a scrambling code for networks operating on the WCDMA standard or a PCI for networks operating on LTE.

Referring to FIG. 3, in a step 110 of the process, the basestation 50 receives a pool of identifiers available for use by basestations within the network. The pool of identifiers may for example be received from an external management system. In a subsequent step 120, the basestation 50 assigns a temporary identifier for the basestation. Assigning a temporary identifier may comprise checking for identifiers in use by basestations within a threshold proximity of the basestation 50, and allocating as the temporary identifier an identifier which is not in use by a basestation within the threshold proximity. The threshold proximity may for example be detection range of the basestation 50 or may be a set radius below which it is possible that basestation coverage may overlap. Having assigned the temporary identifier, the basestation 50 then uses the temporary identifier to receive reports from UEs connected to the basestation 50. The UE reports include measurements of neighboring basestations that the UEs are able to detect. The measurements indicate the identifiers from among the received pool that are already in use by the basestations detected by the connected UEs. In a subsequent process step 160, the basestation 50 then assigns a final identifier for the basestation, selected from among the received pool of identifiers, the final identifier being different from the temporary identifier. The process of assigning a final identifier may comprise assembling a candidate set of identifiers from the received pool of identifiers and then selecting a final identifier from the candidate set. The candidate set may be assembled from the received pool of identifiers by excluding from the received pool of identifiers those identifiers in use by basestations within the threshold proximity of the basestation and those identifiers reported by the connected UEs.

The process 100 illustrated in FIG. 3 may be considered as comprising two stages. In a first stage (steps 110 and 120), the basestation investigates its own RF environment in order to make an initial, temporary identifier selection. The selected temporary identifier allows the basestation to enter service and proceed to a second stage. In the second stage (steps 140 and 160), the basestation requests connected UEs to report measurements of neighboring basestations that they are able to detect, thereby widening the scope of basestation detection to cover the superset of all basestations that a UE may be able to detect while still being connected to the basestation in question. The basestation then proceeds to select a final identifier, excluding from contention all identifiers detected through received UE measurement reports as well as those detected in the first stage. The selected final identifier is also different from the temporary identifier used during the first stage.

Stage two of the process should continue until the basestation has built a sufficiently complete picture of the RF environment of its connected UEs to be able to select a final identifier with reasonable confidence that the selected identifier will be unique within that RF environment. The decision of when to terminate the second stage and proceed to the selection of a final identifier involves balancing this requirement for sufficient information on which to base the selection of a final identifier, with network pressure to establish a final operating environment as quickly as possible. In some embodiments, a single configurable timer may be used to trigger the final identifier selection, expiry of a threshold time limit from adoption of the temporary identifier acting as a trigger to terminate the second stage in selecting a final identifier. In other embodiments, the arrival rate of unknown neighboring basestations may act as a trigger. For example, an algorithm may track the arrival rate of measurement reports from UEs in which a previously unknown basestation is identified. If unknown neighboring basestations have been reported very recently, then it may not yet be appropriate to select a final identifier, as this suggests that the RF environment of the connected UEs is not yet fully discovered. However, once the UE measurement reports indicate only neighboring basestations that have already been detected or previously reported, then it may be assumed with reasonable confidence that the basestation now has knowledge of all relevant cells in the neighboring environment and may proceed to selection of the final identifier. In further embodiments, the number of connected UE reports and the associated path loss variance may also be used to determine the time at which the basestation has sufficient information to terminate the second stage and select its final identifier. In still further embodiments, the trigger may comprise the expiry of a lease period for the temporary identifier used during stage two. The use of lease periods is discussed in further detail below with reference to FIGS. 5 and 6.

Embodiments of the present disclosure thus ensure that a selected final identifier is unique among basestations that can be detected by connected UEs. As discussed above, connected UEs can be used to report which identifiers are being used by basestations within their detection range. However, connected UEs cannot identify a collision situation involving a basestation they are connected to, as the UE will assume all messages received with the relevant identifier are coming from the serving basestation. Simply requesting UEs to report identifiers of detected basestations cannot therefore guarantee the avoidance of a collision, as if the identifier being used to broadcast is involved in the collision, this will not be detected by the UEs. Embodiments of the present disclosure overcome this problem through the above discussed two stage process. The final identifier selected at the end of stage two is different to all identifiers reported by the UEs and is also different to the temporary identifier used to receive UE reports in stage one. In this manner, it is ensured that any potential conflict involving the temporary identifier, which conflict could not be detected by the UEs, is not carried forward into the final operating environment.

Embodiments of the present disclosure may implement the above discussed process 100 in different ways, managing the identifiers made available to it so as to ensure the uniqueness of the final selected identifier. In a first embodiment, when assembling the set of candidate identifiers for final use, the basestation may explicitly exclude from consideration the particular identifier that it has used as its temporary identifier. In another embodiment, identifiers for temporary and final use may be partitioned, such that temporary identifiers may only be selected from a subset of available identifiers, which subset is reserved exclusively for temporary use. In this manner when a basestation comes to select a final identifier, all temporary identifiers that could have been used are excluded from selection as a final identifier. Each of these embodiments is discussed in further detail below with reference to FIGS. 4 to 6.

Figure 4:
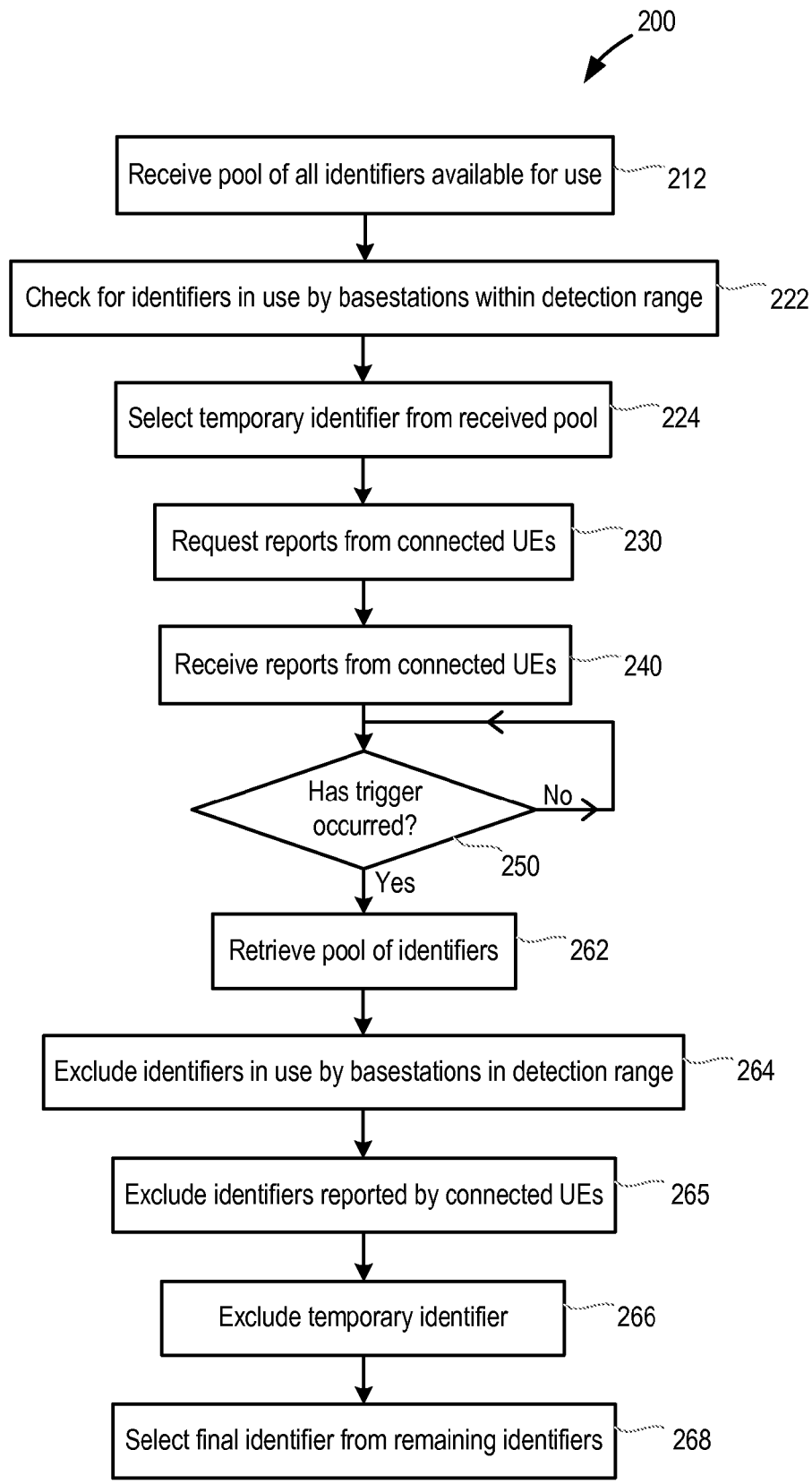
FIGS. 4 to 8 are flow charts illustrating steps in other methods in accordance with the present disclosure.

FIG. 4 is a flow chart illustrating a process 200 by which a basestation, for example the basestation 50, may select a physical layer identifier in order to enter service within the network. FIG. 4 illustrates one example of how the steps of the process 100 may be implemented in order to realize the functionality discussed above. This example corresponds to the first embodiment discussed above with reference to FIG. 3.

Referring to FIG. 4, in a first step 212, the basestation 50 receives a pool of identifiers. The pool comprises the set of all identifiers available for use by basestations within the network. The basestation 50 then investigates its own RF environment to check for identifiers in use by basestations within a detection range of the basestation 50, at step 222. In the case of a small cell basestation, this may be done through a radio environment scan. The check performed at step 222 enables the basestation 50 to compare the detected identifiers with the received pool of identifiers and select a temporary identifier from the received pool of identifiers which is not in use by any basestation within a threshold proximity, which according to the present embodiment may be the detection range of the basestation 50. The selection of a temporary identifier is performed at step 224 and represents the termination of stage one of the process.

Having selected a temporary identifier from the received pool, the basestation is then able to enter service and commence stage two of the process. The basestation requests, at step 230, that all connected UEs report measurements of neighboring basestations detected by the UEs. The basestation 50 receives the requested reports at step 240. While receiving the reports of the connected UEs, the basestation 50 checks for the occurrence of a trigger at step 250. As discussed above, the trigger comprises a condition indicating that the basestation 50 may terminate stage two of the procedure and select a final identifier. The trigger may comprise expiry of a time limit, which may be configured by a network operator. For example, a timer may be configured to start when the basestation 50 enters service with the temporary identifier. The threshold time limit may then be configured by the operator according to network requirements or particularities of the deployment situation, including for example the likely number of neighboring basestations, local density of UEs etc.

In other examples, the trigger may comprise a condition involving time elapsed since receipt of a report indicating a previously unknown neighboring basestation. The trigger may be selected and or configured according to the network requirements and, as discussed above, should balance the requirement of the basestation for adequate information on which to base the selection of a final identifier, with network pressure to establish a final operating environment as quickly as possible.

If the basestation discovers that the trigger has not yet occurred (No at step 250), the basestation 50 continues to receive reports from connected UEs until the trigger event occurs, indicating that an adequate picture of the RF environment of connected UEs has been established to allow selection of a final identifier. Once the basestation establishes that the trigger event has occurred (Yes at step 250), the basestation 50 may proceed to assemble a candidate set of final identifiers. This candidate set is assembled from the pool of identifiers received in step 212. The basestation 50 initially retrieves this received pool of identifiers at step 262 and then in step 264 excludes from the received pool all identifiers discovered to be in use by neighboring basestations detected in step 222. The basestation 50 then further excludes in step 265 all identifiers reported by connected UEs in step 240. The basestation then also excludes from consideration the temporary identifier that was selected at step 224 and used during stage two of the process. The remaining identifiers form the candidate set which thus comprises the set of all identifiers that are unique within the RF environment of UEs connected to the basestation 50. As discussed above, it is not possible for the basestation 50 to determine through its connected UEs whether or not the temporary identifier used in stage two is unique within the RF environment of its connected UEs. Therefore, in order to exclude the possibility of a collision, this temporary identifier is explicitly excluded from the candidate set of final identifiers.

Having assembled the candidate set of final identifiers, the basestation then selects from that candidate set a final identifier for use in the basestation 50. The above discussed process thus ensures that the selected final identifier will satisfy condition one discussed above, ensuring that no connected UE will simultaneously receive the same identifier from more than one basestation.

Figure 5:
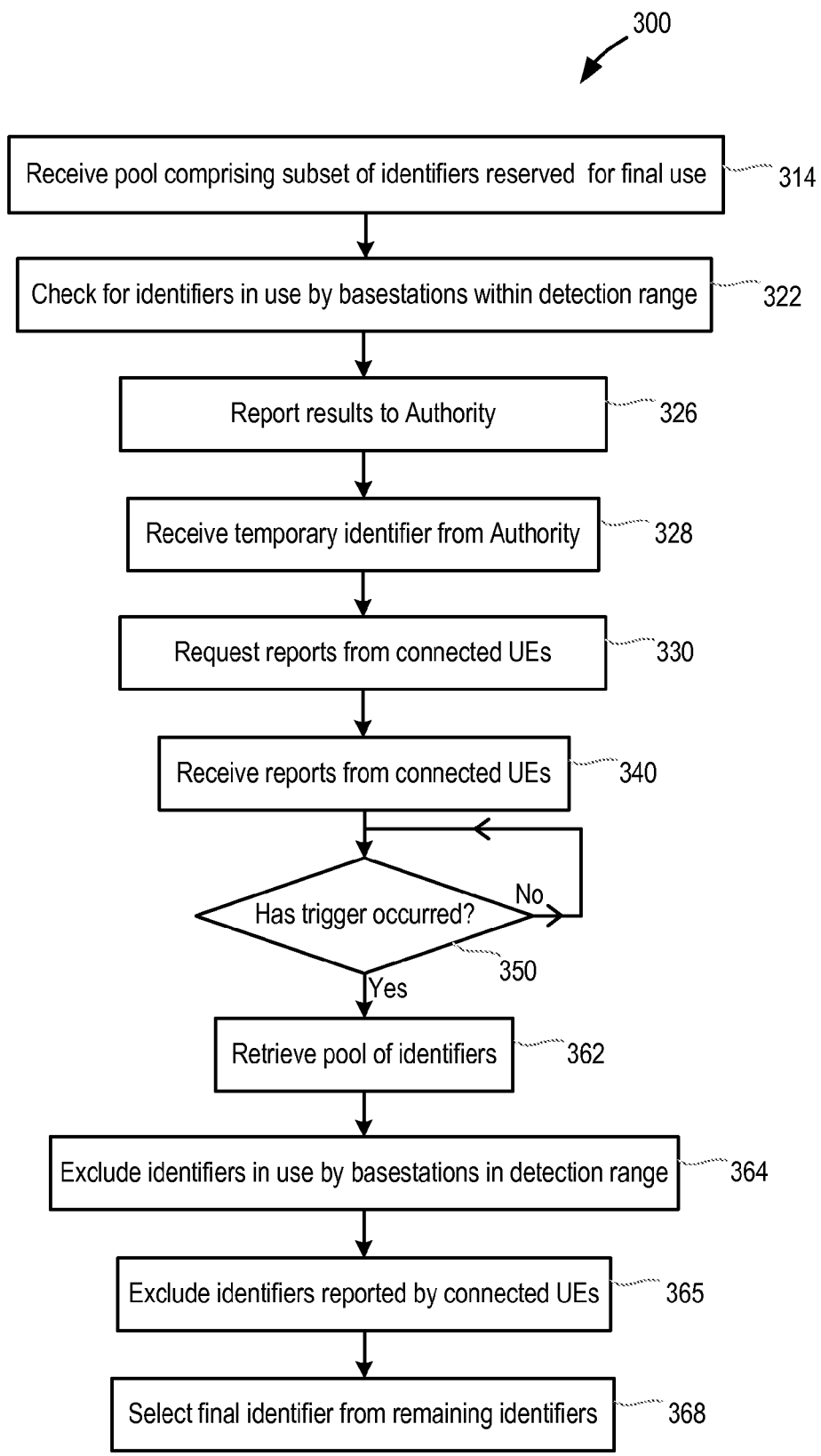

FIG. 5 is a flow chart illustrating another process 300 by which a basestation, for example the basestation 50, may select a physical layer identifier in order to enter service within the network. FIG. 5 illustrates another example of how the steps of the process 100 may be implemented in order to realize the desired functionality. This example corresponds to the second embodiment discussed with reference to FIG. 3.

According to the example illustrated in FIG. 5, the set of all identifiers available for use by basestations within the network is partitioned into two subsets. A first subset comprises identifiers reserved for final use by basestations within the network. The second subset comprises identifiers reserved for temporary use by basestations within the network. The illustrated process makes reference to an authority or controlling entity, which controls access to the subset of identifiers reserved for temporary use. This authority may be centralized, for example in the core network of the mobile communications network, or may be distributed between basestations within the network.

Referring to FIG. 5, in a first step 314, the basestation 50 receives a pool of identifiers. The received pool of identifiers comprises the subset of identifiers reserved for final use by basestations within the network. The basestation 50 then investigates its own RF environment to check for identifiers in use by basestations within a detection range of the basestation 50, at step 322. In the case of a small cell basestation, this may be done through a radio environment scan. The basestation 50 reports the results of this scan to the authority in step 326 and receives from the authority a temporary identifier at step 328. The process by which the temporary identifier is selected by the authority and allocated to the basestation 50 is discussed below with reference to FIG. 6. The temporary identifier may be received from the authority together with an associated lease period, during which period the basestation 50 may operate using the received temporary identifier. The lease period is also discussed in further detail below with reference to FIG. 6. Receipt of the temporary identifier terminates the first stage of the process 300.

Having received a temporary identifier from the authority in step 328, the basestation 50 may enter service and commence stage two of the process. The basestation requests, at step 330, that all connected UEs report measurements of neighboring basestations detected by the UEs. The basestation 50 receives the requested reports at step 340. While receiving the reports of the connected UEs, the basestation 50 checks for the occurrence of a trigger at step 350. As discussed above, the trigger comprises a condition indicating that the basestation 50 may terminate stage two of the procedure and select a final identifier.

According to the illustrated example, the trigger may for example comprise the first to occur of the expiry of the lease period associated with the temporary identifier received from the authority, or the satisfaction of a condition such as those discussed above with respect to FIGS. 3 and 4. In some examples, the lease period may be defined in units of time or by the satisfaction of a condition such as the time elapsed since the last previously unknown neighboring basestation was reported.

If the basestation discovers that the trigger has not yet occurred (No at step 350), the basestation 50 continues to receive reports from connected UEs until the trigger occurs. Once the basestation establishes that the trigger has occurred (Yes at step 350), the basestation 50 may proceed to assemble a candidate set of final identifiers. This candidate set is assembled from the pool of identifiers received in step 314, and thus is assembled from a subset which includes only those identifiers reserved for final basestation use. The basestation 50 initially retrieves this received pool of identifiers at step 362 and then in step 364 excludes from the received pool all identifiers discovered to be in use by neighboring basestations detected in step 322. The basestation 50 then further excludes in step 365 all identifiers reported by connected UEs in step 340. The remaining identifiers comprise the candidate set of final identifiers and the basestation then selects a final identifier from this candidate set in step 368. The basestation 50 is not required to explicitly exclude its temporary identifier from the candidate set as the set is assembled from the received pool comprising only those identifiers reserved for final basestation use. The temporary identifier assigned to the basestation by the authority is drawn from the subset of identifiers reserved for temporary use, and thus is not included within the pool received at the basestation 50 and from which the candidate set of final identifiers is assembled.

Figure 6:
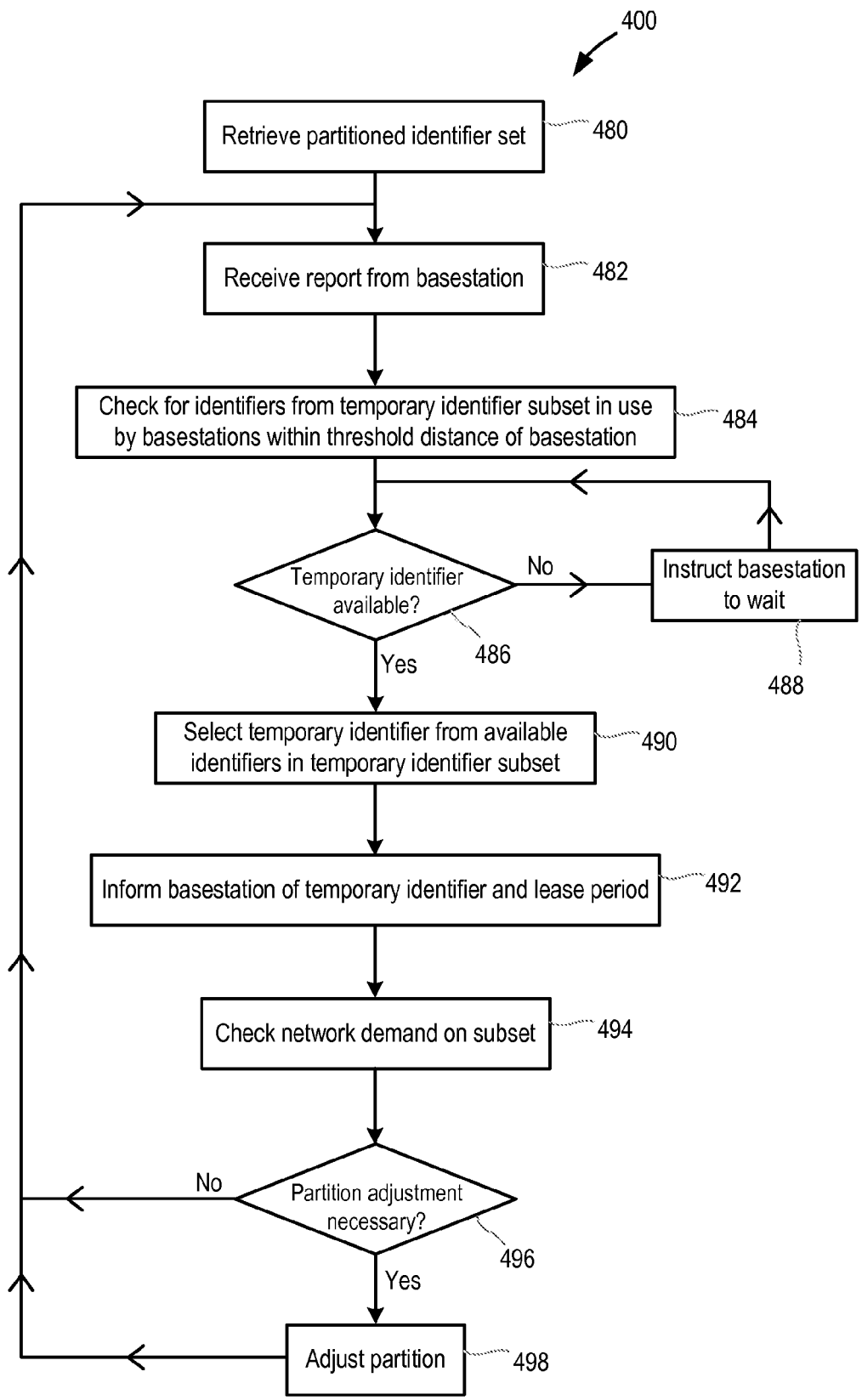

FIG. 6 is a flow chart illustrating a process 400 by which the authority discussed above may assign a temporary identifier to a basestation such as the basestation 50.

Referring to FIG. 6, in a step 480 the authority retrieves the partitioned set of identifiers for use by basestations within the network. As discussed above, the set is partitioned into two subsets of identifiers reserved for final use and identifiers reserved for temporary use. At step 482, the authority receives from the basestation 50 a report of identifiers in use by basestations within a detection range of the basestation 50. In some examples, the authority may also receive from the basestation other identification and/or positioning information, such as for example GPS coordinates, enabling the authority to locate the basestation within the mobile network. The authority then proceeds to select a temporary identifier for the basestation 50.

The authority selects temporary identifiers to allocate to basestations from the subset of identifiers reserved for temporary use. The authority acts to ensure that within a limited proximity, only one basestation at a time is using any one of the identifiers in the temporary use subset. The limited proximity may be defined by the network operator but may for example comprise a threshold distance or separation below which basestation coverage is likely to overlap. This distance is dependent upon the transmission power of the basestations but may for example be within a range of between 50 m and 200 m.

After receiving a report from the basestation 50, the authority checks, at step 484 what if any identifiers from the temporary use subset are currently in use within the above discussed limited proximity of the basestation 50. At step 486, the authority determines whether any identifiers from the temporary use subset are available within the limited proximity of the basestation 50. If all identifiers in the temporary use subset are currently in use within the limited proximity of the basestation 50 (No at step 486), the authority instructs the basestation 50 to wait in step 488. The authority then continues to check for availability of a temporary use identifier within the limited proximity of the basestation 50. When one or more temporary use identifiers become available for use within the limited proximity of the basestation 50 (Yes at step 486), the authority selects a temporary identifier from among the available temporary identifiers in step 490. The authority then informs the basestation 50 of the selected temporary identifier and of a lease period over which the basestation 50 may use the temporary identifier.

The use of lease periods assists the authority in managing the availability of identifiers from the temporary use subset. The lease period may be defined in terms of a time period over which the basestation 50 may use the selected temporary identifier. Alternatively, the lease period may be defined in terms of a condition to be fulfilled, fulfillment of the condition terminating the lease period. As discussed above, the condition may be representative of receipt of sufficient information concerning the RF environment of connected UEs to allow selection of a final identifier. On expiry of the lease period, the basestation is required to terminate stage two and select a final identifier, releasing the temporary identifier for allocation to another newly deployed basestation within the limited proximity. The nature and/or duration of the lease period may be set by a network operator or may be set by the authority according to the particular network or deployment conditions applying to an individual basestation.

The authority may perform periodic checks to establish the demand placed on one or both of the subsets of identifiers, and may adjust the partition between the subsets accordingly. For example, at step 494, the authority may check demand on one or both of the subsets. Demand on the temporary identifier subset may be assessed by analyzing a delay period for availability of a temporary identifier on receipt of a report from a basestation. Demand on the final identifier subset may be assessed by analyzing UE measurement statistics indicating degrees of freedom experienced in assigning identifiers from the final identifier subset. If either subset appears to be experiencing particularly high demand, the authority may determine that an adjustment of the partition between the subsets is necessary at step 496. If such an adjustment is necessary, the authority adjusts the partition at step 498, placing more identifiers into the temporary or final use subset as required.

The processes illustrated in FIGS. 5 and 6 also enable selection by basestation 50 of a final identifier that will satisfy condition one discussed above, ensuring that no connected UE will simultaneously receive the same identifier from more than one basestation.

Each of the examples discussed above offers particular advantages that may be appropriate for different deployment or network situations. For example, the processes of FIGS. 5 and 6 offer the possibility of ensuring that even during stage one use of a temporary identifier, there is no possibility of a collision situation occurring. However, a trade-off may need to be made between identifier subset efficiency and the risk of identifier collision. The processes of FIGS. 5 and 6 are thus particularly appropriate for use in deployment of individual basestations, or several basestations that are widely dispersed geographically. In such situations, the demand placed on the temporary use subset within a limited area is likely to be small. In contrast, in cases where a large number of basestations are to be initialized within a limited proximity, for example multiple small cells in a single building, the process of FIG. 4 may be more appropriate. The process of FIG. 4 addresses the possibility of high simultaneous demand by making the full pool of identifiers available for both temporary and final use. This increase in capacity comes at the expense of possible identity collision during stage one. However, the risk of collision is minimized by making the full pool of identifiers available, and the potential collision is only in existence for a limited time period, during stage one of the process.

In each of the examples discussed above, there exists the possibility that two or more basestations in close proximity may concurrently be engaged in stage two operation, receiving reports from connected UEs while using a temporary identifier. These basestations may exit stage two with one or more common identifiers in the candidate set of final identifiers. It is possible that the final identifier selected by the first of these basestations may not be exposed to the remaining basestation or basestations via their connected UEs before these later basestations select their final identifiers. There exists therefore a remote possibility of a collision situation arising.

Figure 7:
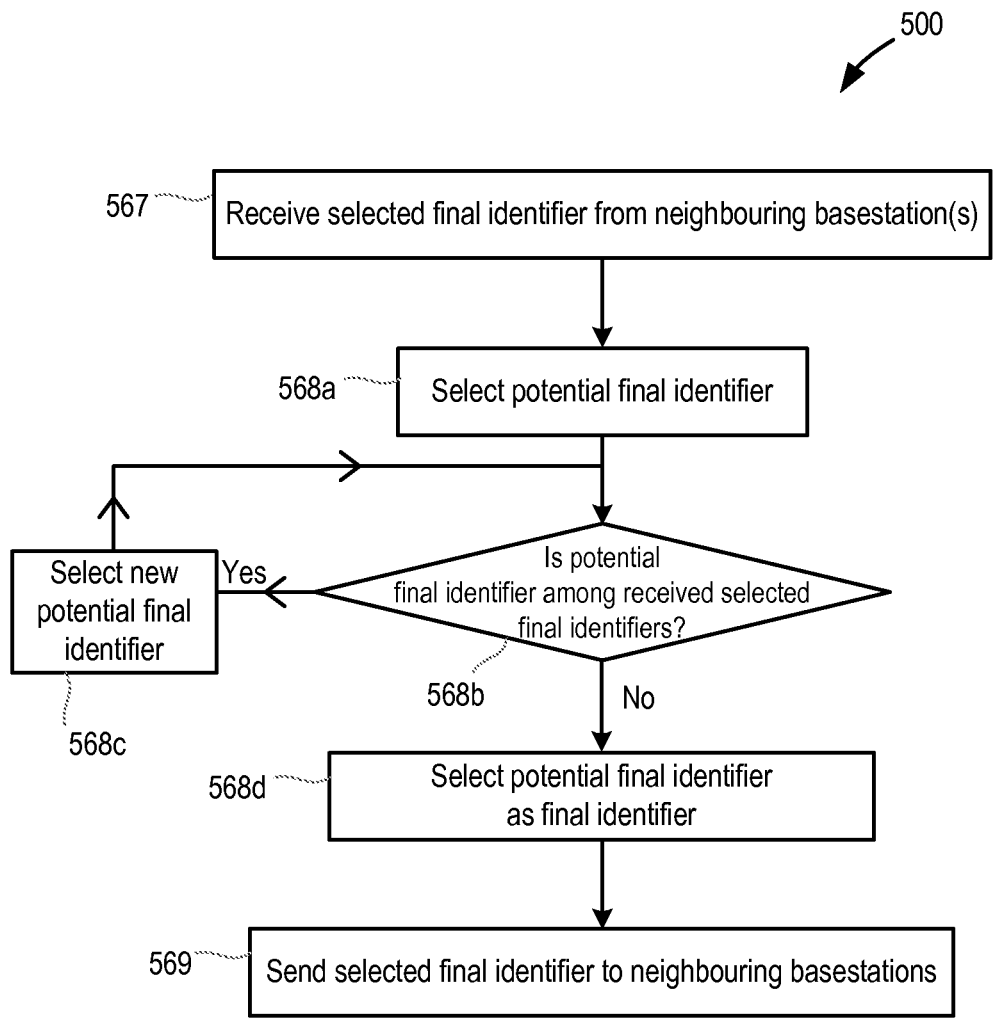
Figure 8:
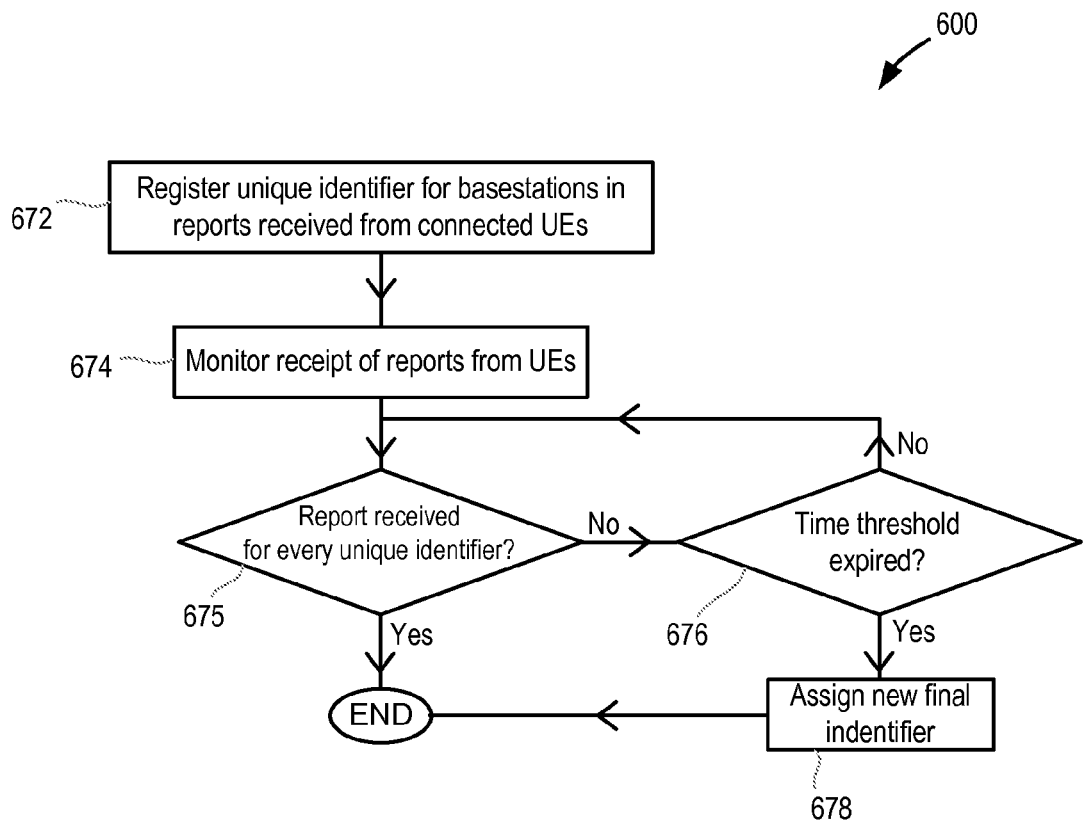

FIGS. 7 and 8 are flow charts illustrating two processes by which collision situations discussed above may be prevented and/or addressed.

Referring to FIG. 7, according to a first example process 500, the process step 268 or 368 of selecting a final identifier may be enhanced with communication between neighboring basestations. In a step 567, the basestation 50 receives selected final identifiers from neighboring basestations. In step 568*a*, the basestation 50 selects a potential final identifier from the candidate set of final identifiers assembled in the previous steps. The basestation 50 then checks whether or not this potential final identifier appears among the selected final identifiers received in step 567. If the potential final identifier is among the received selected final identifiers (Yes in step 568*b*), the basestation 50 selects a new potential final identifier from among the candidate set in step 568*c* and proceeds to repeat the check of step 568*b*. If the potential final identifier does not feature among the selected final identifiers received in step 567 (No at step 568*b*), the basestation 50 proceeds to select the potential final identifier as the final identifier in step 568*d* and informs neighboring basestations of the selected final identifier in step 569.

The communication between neighboring basestations may be achieved for example using an X2 interface in networks operating on the LTE standard.

Referring to FIG. 8, according to another example process 600, the basestation 50 registers, at a step 672, a unique identifier for neighboring basestations in reports received from connected UEs. The unique identifier may for example be an (E-)CGI, which, unlike physical layer identifiers, are globally unique and persistent across changes in PCI or scrambling code. Following the start of operation on the final identifier selected in step 268 or 368, the basestation 50 monitors receipt of reports from connected UEs in step 674. The basestation checks in step 675 whether a report has been received for every unique identifier registered in step 672. If a report has been received for every registered unique identifier (Yes at step 675) then the selected final identifier is confirmed to be unique within the RF environment of connected UEs and the process ends. If no report has been received for one or more of the registered unique identifiers (No at step 675), the basestation 50 checks whether or not a time threshold has expired at step 676. While the threshold has not expired (No at step 676) the basestation 50 continues to check for receipt of a report for every registered unique identifier. If on expiry of the time threshold there remain one or more unique identifiers for which no report has been received (Yes at step 676) there is a possibility that a local collision may have occurred. The basestation 50 therefore selects a new final identifier from the candidate set in step 678 and the previous selected identifier is excluded from the candidate set.

One or both of the above described processes may be employed to act as a failsafe mechanism, ensuring that in the event of one or more basestations being engaged in simultaneous stage two operation, a local collision does not occur. Which process is employed may depend upon the particularities of a deployment situation. For example, inter-basestation communication may not always be feasible, in which case the process 600 illustrated in FIG. 8 would be the more suitable process. In deployment situations where inter-basestation communication is feasible, the process 500 may be employed as a primary means of dealing with simultaneous stage two operation, with process 600 acting for example as an optional additional failsafe mechanism, allowing recovery from a local collision that may have arisen in exceptional circumstances.

Embodiments of the present disclosure thus provide processes delivering a robust allocation scheme for physical layer identifiers used by communication network basestations. The processes enable a basestation to automatically select its own physical layer identifier from a pool of available identifiers, ensuring that the selected identifier is unique with respect to all basestations detectable by UEs connected to the basestation. This unique identifier represents satisfaction of condition one described above and offers improvements in network performance, particularly in reducing the incidence of dropped calls. The processes of the present disclosure offer particular advantages for dense deployments of basestations with no or limited pre-deployment RF planning, and where a limited set of physical layer identifiers is available.

It will be appreciated that the above-mentioned embodiments illustrate rather than limit the disclosure, and that certain process steps may be performed in a different order to that described above without departing from the scope of the present disclosure.

The invention claimed is:

1. A method for selecting a physical layer identifier for use in a basestation in a mobile communications network, comprising:
   receiving a pool of identifiers available for use by basestations within the network, wherein the pool of identifiers comprises a subset of all temporary identifiers and a subset of all final identifiers available for use by basestations within the network;
   checking for network demand on at least one of the subsets of available identifiers, wherein checking for network demand comprises checking for network demand on the temporary identifier subset and checking for network demand on the final identifier subset, wherein checking for network demand on the temporary identifier subset comprises analyzing a delay period for availability of a temporary identifier on receipt of a report from a basestation, and wherein checking for network demand on the final identifier subset comprises analyzing a degree of freedom experienced by basestations in selecting a final identifier from the final identifier subset;
   adjusting the partition between the subsets according to the network demand;
   assigning a temporary identifier for the basestation and instructing the basestation to use the identifier for a lease period;
   receiving from connected UEs reports of identifiers from among the received pool that are in use by basestations detected by the connected UEs; and
   assigning a final identifier for the basestation selected from the received pool of identifiers, wherein the final identifier is different from the temporary identifier.

2. A method as claimed in claim 1, wherein assigning the final identifier comprises:
   assembling a candidate set of identifiers from the received pool of identifiers; and
   selecting the final identifier from the candidate set.

3. A method as claimed in claim 2, wherein assembling a candidate set of identifiers comprises:
   retrieving the received pool of identifiers;
   excluding identifiers in use by basestations within a threshold proximity of the basestation; and
   excluding identifiers reported by connected UEs.

4. A method as claimed in claim 1, wherein assigning the temporary identifier comprises:
   checking for identifiers in use by basestations within a threshold proximity of the basestation; and
   selecting from the received pool of identifiers an identifier which is not in use by a basestation within the threshold proximity.

5. A method as claimed in claim 4, wherein assigning the final identifier comprises:
   excluding identifiers in use by basestations within the threshold proximity of the basestation;
   excluding identifiers reported by connected UEs;
   excluding the assigned temporary identifier; and
   selecting the final identifier from the remaining pool of identifiers.

6. A method as claimed in claim 1, wherein assigning the temporary identifier comprises:
   checking for identifiers in use by basestations within a threshold proximity of the basestation;
   reporting results of the checking to an authority; and
   receiving from the authority an allocated temporary identifier.

7. A method as claimed in claim 1, wherein the method further comprises checking for occurrence of a trigger and assigning the final identifier on detecting occurrence of the trigger.

8. A method as claimed in claim 1, wherein the method further comprises notifying neighboring basestations of the final identifier for the basestation.

9. A method as claimed in claim 8, wherein assigning the final identifier comprises:
  selecting a potential final identifier;
  checking if the potential final identifier is among selected identifiers notified by neighboring basestations, and
  if the potential final identifier is not among selected identifiers notified by neighboring basestations, assigning the potential final identifier as the final identifier; and
  if the potential final identifier is among selected identifiers notified by neighboring basestations, selecting a different final identifier as the final identifier for the basestation.

10. A method as claimed in claim 1, further comprising:
  registering a unique identifier for basestations in reports received from connected UEs; and, after assigning the final identifier:
  monitoring receipt of reports from UEs; and
  assigning a new final identifier if no report is received from a connected UE for one or more of the unique identifiers during a threshold period of time.

11. A method for assigning a temporary identifier to a basestation in a mobile communications network, comprising:
  retrieving a set comprising all temporary identifiers and all final identifiers available for use by basestations within the network, wherein the set is partitioned into a subset of all the temporary identifiers reserved for temporary use and a subset of all the final identifiers reserved for final use;
  receiving from the basestation a report of identifiers in use by other basestations within a threshold proximity of the basestation;
  checking for network demand on at least one of the subsets of available identifiers, wherein checking for network demand comprises checking for network demand on the temporary identifier subset and checking for network demand on the final identifier subset, wherein checking for network demand on the temporary identifier subset comprises analyzing a delay period for availability of a temporary identifier on receipt of a report from a basestation, and wherein checking for network demand on the final identifier subset comprises analyzing a degree of freedom experienced by basestations in selecting a final identifier from the final identifier subset;
  adjusting the partition between the subsets according to the network demand;
  selecting from among the subset of identifiers reserved for temporary use an identifier which is not in use by another basestation within the threshold proximity of the basestation;
  allocating the selected identifier to the basestation as a temporary identifier and instructing the basestation to use the identifier for a lease period.

12. A method as claimed in claim 11, wherein, if all identifiers in the temporary identifier subset are in use by the other basestations within the threshold proximity of the basestation, the method further comprises waiting until an identifier in the temporary identifier subset becomes available within the threshold proximity of the basestation.

13. Non-transitory tangible media that includes instructions for execution, which when executed by a processor, is operable to perform operations comprising:
  receiving a pool of identifiers available for use by basestations within a network, wherein the pool of identifiers comprises a subset of all temporary identifiers and a subset of all final identifiers available for use by basestations within the network;
  checking for network demand on at least one of the subsets of available identifiers, wherein checking for network demand comprises checking for network demand on the temporary identifier subset and checking for network demand on the final identifier subset, wherein checking for network demand on the temporary identifier subset comprises analyzing a delay period for availability of a temporary identifier on receipt of a report from a basestation, and wherein checking for network demand on the final identifier subset comprises analyzing a degree of freedom experienced by basestations in selecting a final identifier from the final identifier subset;
  adjusting the partition between the subsets according to the network demand;
  assigning a temporary identifier for the basestation and instructing the basestation to use the identifier for a lease period;
  receiving from connected UEs reports of identifiers from among the received pool that are in use by basestations detected by the connected UEs;
  assigning a final identifier for the basestation selected from the received pool of identifiers, wherein the final identifier is different from the temporary identifier.

14. A method as claimed in claim 10, wherein the unique identifier is different from any of the identifiers comprised in the received pool of identifiers.

15. The non-transitory tangible media of claim 14, wherein assigning the temporary identifier comprises:
  checking for identifiers in use by basestations within a threshold proximity of the basestation; and
  allocating as the temporary identifier an identifier that is not in use by a basestation within the threshold proximity.

16. The non-transitory tangible media of claim 14, wherein assigning the temporary identifier comprises:
  checking for identifiers in use by basestations within a threshold proximity of the basestation; and
  selecting from the received pool of identifiers an identifier which is not in use by a basestation within the threshold proximity.

17. The non-transitory tangible media of claim 16, wherein assigning the final identifier comprises:
  excluding identifiers in use by basestations within the threshold proximity of the basestation;
  excluding identifiers reported by connected UEs;
  excluding the assigned temporary identifier; and
  selecting the final identifier from the remaining pool of identifiers.

18. The non-transitory tangible media of claim 14, wherein assigning the temporary identifier comprises:
  checking for identifiers in use by basestations within a threshold proximity of the basestation;
  reporting results of the checking to an authority; and
  receiving from the authority an allocated temporary identifier.

19. The non-transitory tangible media of claim 14, further comprising instructions for execution, which when executed by the processor, is operable to perform operations comprising:

notifying neighboring basestations of the final identifier for the basestation.

20. The non-transitory tangible media of claim 19, wherein assigning the final identifier comprises:
- selecting a potential final identifier;
- checking if the potential final identifier is among selected identifiers notified by neighboring basestations, and
- if the potential final identifier is not among selected identifiers notified by neighboring basestations, assigning the potential final identifier as the final identifier; and
- if the potential final identifier is among selected identifiers notified by neighboring basestations, selecting a different final identifier as the final identifier for the basestation.

* * * * *